(12) United States Patent
Kaizuka (10) Patent No.: US 7,236,057 B2
(45) Date of Patent: *Jun. 26, 2007

(54) SPREAD SPECTRUM CLOCK GENERATOR

(75) Inventor: Masao Kaizuka, San Jose, CA (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 630 days.

This patent is subject to a terminal disclaimer.

(21) Appl. No.: 10/647,929

(22) Filed: Aug. 26, 2003

(65) Prior Publication Data

US 2005/0069019 A1    Mar. 31, 2005

(51) Int. Cl.
   *H03L 7/00* (2006.01)
(52) U.S. Cl. .................. 331/1 A; 331/78; 332/123; 375/130; 375/376; 713/500
(58) Field of Classification Search ............... 375/376, 375/130; 327/156; 332/123; 713/500; 331/1 A, 331/78
See application file for complete search history.

(56) References Cited

U.S. PATENT DOCUMENTS

| | | | |
|---|---|---|---|
| 3,833,854 A | 9/1974 | Schonover | |
| 5,118,975 A | 6/1992 | Hillis et al. | |
| 5,488,627 A | 1/1996 | Harden et al. | |
| 5,631,920 A | 5/1997 | Hardin | |
| 5,675,832 A | 10/1997 | Ikami et al. | |
| 5,867,524 A | 2/1999 | Booth et al. | |
| 5,872,807 A | 2/1999 | Booth et al. | |
| 6,144,242 A | 11/2000 | Jeong et al. | |
| 6,404,834 B1 | 6/2002 | Hardin et al. | |
| 6,501,307 B1 | 12/2002 | Yen | |
| 6,553,057 B1 | 4/2003 | Sha et al. | |
| 6,993,109 B2 * | 1/2006 | Lee et al. | ............ 375/376 |

* cited by examiner

*Primary Examiner*—Arnold Kinkead
(74) *Attorney, Agent, or Firm*—Tucker Ellis & West LLP (57) ABSTRACT

A clock signal generator varies a frequency of a digital clock over a selected range of frequencies. The generator employs a divider for lowering a frequency of a clock signal. A counter increments synchronously with the signal, and causes a selected sequence of outputs to be generated by a pattern generator. The pattern generator output forms an input to a digitally controllable delay line which receives the lower frequency clock signal. The pattern generator causes the digital delay line to vary a frequency of the lowered frequency clock signal between selected boundaries. The varying frequency clock signal is then raised up again such that a final clock has a varying frequency, and will exhibit less EMI spiking during switching of an associated, synchronous digital data device. The solid state nature of the generator allows for simple fabrication, inexpensive manufacture and ready integration into digital circuitry, such as multifunction integrated circuits.

15 Claims, 3 Drawing Sheets

SPREAD SPECTRUM CLOCK GENERATOR

BACKGROUND OF THE INVENTION

The subject application is directed generally to the art of synchronous digital circuitry, and more particularly to synchronous digital circuitry in which a lessened effect of electromagnetic interference ("EMI") is desirable.

Most digital devices today operate synchronously. That is, data processing operations occur under a timing dictated by a digital clock signal. Such digital clock signals are typically square waves that oscillate at a selected frequency. As improvements are made to digital processing devices, clock frequencies may be increased. Faster clock frequencies allow for improved data processing throughput. Current digital clock frequencies are already in the multi-gigahertz range. As clock frequencies continue to rise, an increased incidence of electromagnetic interference exists. Such EMI requires that special shielding or casing be developed to dampen such interference. EMI can cause data errors in associated data processing devices, as well as provide for radio frequency ("RF") interference for analog devices such as radios and televisions.

Designers have become aware that implementing a spread spectrum clock generator ("SSCG") works to substantially reduce the high energy spikes associated with digitally-generated EMI.

SSCG circuitry functions to vary slightly a frequency of a digital clock signal over time. This is accomplished by reducing "noise" associated with harmonics of a large scale integration ("LSI") clock signal. SSCG circuitry functions to alter slightly a signal interval and thus diffuses a frequency spectrum and lowers a peak value.

A side effect from the use of an SSCG is an introduction of a slight jitter in the system clock. However, such jitter is generally of little consequence other than in particular applications relating to communication network interfaces or input/output interfaces, as well as other applications having varying tolerance to jitter. Thus, it is desirable to be able to vary a degree of frequency shift and associated jitter to accommodate a lessening of peak EMI while simultaneously minimizing the jitter to acceptable application parameters.

Current SSCG circuitry employs frequency comparators and voltage controlled oscillators ("VCO") to accomplish the shifting of frequency to result in a modulated clock signal. While effective, such analog-based implementations render it difficult and expensive to accomplish an SSCG circuitry, particularly in applications when a system is desired to coexist on other standard digital circuitry and in conjunction with a single substrate.

The subject invention provides for a digital spread spectrum clock generator which accomplishes selected frequency variation of an associated digital clock while minimizing the required use of extensive or incompatible analog circuitry.

SUMMARY OF THE INVENTION

In accordance with the subject invention, there is provided a spread spectrum clock generator which includes a divider for lowering a frequency of an input clock signal. A digital counter is incremented synchronously with the clock signal. The counter, in turn, processes through a selected sequence of outputs to be generated by a pattern generator. The pattern generator output, in turn, is communicated to a digitally controllable delay circuit into which the lowered frequency clock signal is provided. Thus, a variation in frequency to the clock signal is controlled by the selected pattern in the pattern generator. This varying frequency clock signal is then multiplied to a higher overall frequency compatible with the original clock signal, and output as a clock signal to remaining, synchronous digital circuitry.

In accordance with another aspect of the present invention, the frequency variation of the modified clock signal is toggled between a selected higher limit and selected lower limit.

In accordance with another aspect of the present invention, a method is provided for generating a spread spectrum clock signal in accordance with the foregoing.

SUMMARY OF THE DRAWINGS

The subject invention is described with reference to certain parts, and arrangements to parts, which are evidenced in conjunction with the associated drawings which form a part hereof and not for the purposes of limiting the same in which.

DETAILED DESCRIPTION OF THE PREFERRED EMBODIMENT

Figure 1A:
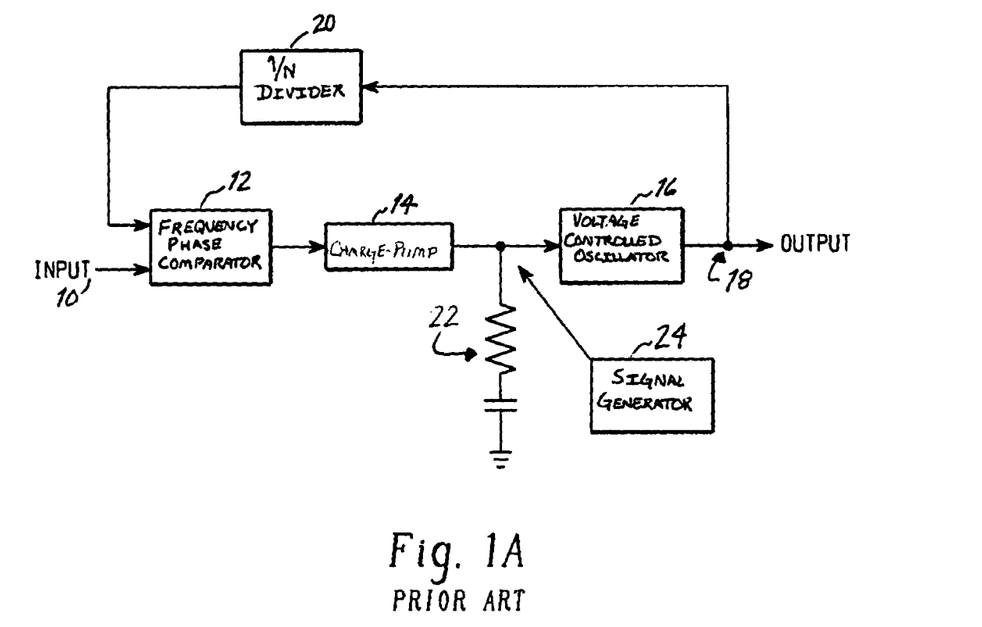
FIG. 1 is a schematic of a conventional spread spectrum clock generator.

Turning now to the drawings wherein the illustrations are for the purpose of illustrating the preferred embodiment only, and not for the purpose of delivering the same, FIG. 1A shows a block diagram of a conventional spread spectrum clock generator. In a conventional system, a clock input 10 was provided as one input to a frequency phase comparator 12. An output of the comparator 12 was provided to a charge pump 14, the output of which is provided to a voltage controlled oscillator ("VCO 16"). Output 18 of the VCO 16 forms a system clock output, as well as a feedback loop into frequency comparator 12 via a 1/N divider 20.

A conventional spread spectrum clock generator employed an RC circuit 22 as a filter to ground. A signal generator 24 served to generate a waveform (such as that evidenced in FIG. 1B) into the input of the VCO 16. By injecting this signal into the VCO input, an output frequency at output 18 was modulated in conjunction with the waveform of FIG. 1B.

Figure 1B:
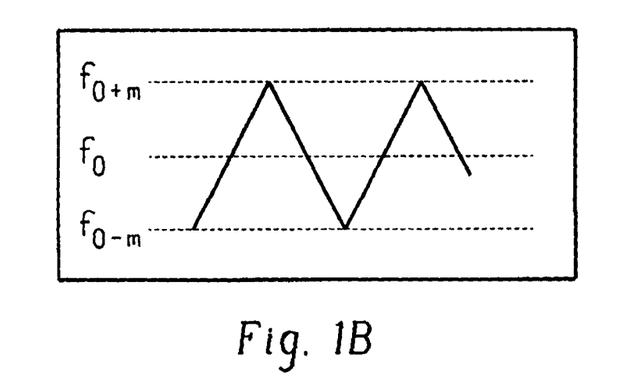

It will be appreciated by the view of FIGS. 1A and 1B that the basic circuitry employed in the spread spectrum clock generator was that of a phaselock loop. The system, while functional, relied heavily on analog circuitry and was thus not readily adaptable to implementation in conjunction with digital circuitry.

Figure 2:
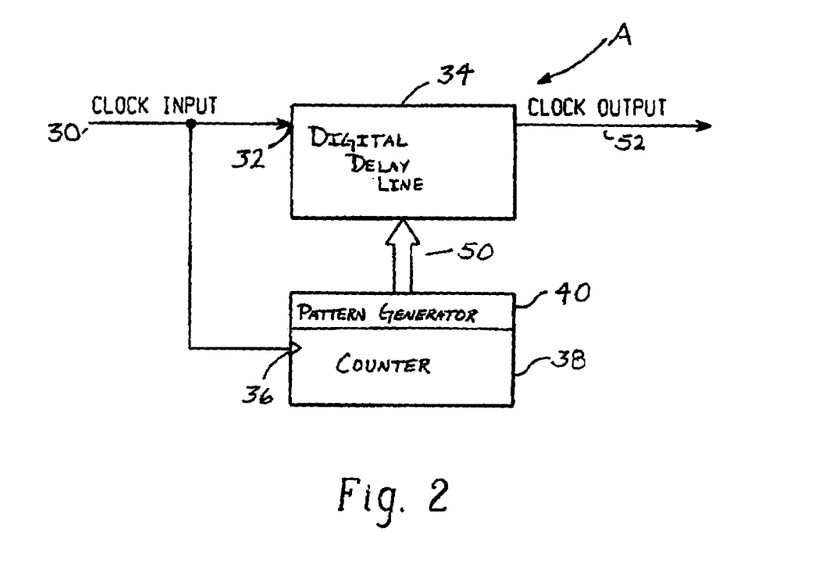
FIG. 2 is a diagram of the improved spread spectrum clock generator of the present invention.

Turning now to FIG. 2, the basic architecture of the spread spectrum clock generator of the present invention is described. The SSCG A includes a clock input 30, which input is provided by the standard clock generated in conjunction with a frequency associated with an associated synchronous digital system. The clock input from 30 is communicated to an input 32 of a digital delay line 34. The input 30 is also communicated to an input 36 of a counter 38. The counter 38 is suitably comprised of any simple binary counter. In the preferred embodiment, the counter 38 functions to count an increment on the basis of a number of input clock signals generated at counter input 36.

The counter 38 is in data communication with the pattern generator 40 through its output lines thereof (not shown). In a simple binary counter, a series of binary lines are provided which correspond to a base numeric sequence. In a preferred embodiment, a particular binary number placed on an input to the pattern generator results in the providing of a preselected digital value at an output 50 thereof. A particular pattern of a pattern generator 40 of the preferred embodiment will be detailed in conjunction with Table 1, below. In the preferred embodiment, sequencing the counter 38 will result in a periodically repeating pattern being generated by pattern generator 4 at output 50.

TABLE 1

The TRUTH table of Pattern Generator

| S | D | V |
|---|---|---|
| 0 | 0 | 16 |
| 1 | 0 | 16 |
| 2 | 0 | 16 |
| 3 | 1 | 17 |
| 4 | 0 | 17 |
| 5 | 0 | 17 |
| 6 | 0 | 17 |
| 7 | 0 | 17 |
| 8 | 1 | 18 |
| 9 | 0 | 18 |
| 10 | 0 | 18 |
| 11 | 0 | 18 |
| 12 | 1 | 19 |
| 13 | 0 | 19 |
| 14 | 0 | 19 |
| 15 | 1 | 20 |
| 16 | 0 | 20 |
| 17 | 1 | 21 |
| 18 | 0 | 21 |
| 19 | 1 | 22 |
| 20 | 0 | 22 |
| 21 | 1 | 23 |
| 22 | 0 | 23 |
| 23 | 1 | 24 |
| 24 | 0 | 24 |
| 25 | 1 | 25 |
| 26 | 0 | 25 |
| 27 | 1 | 26 |
| 28 | 1 | 27 |
| 29 | 0 | 27 |
| 30 | 1 | 28 |
| 31 | 1 | 29 |
| 32 | 1 | 30 |
| 33 | 0 | 30 |
| 34 | 1 | 31 |
| 35 | 1 | 32 |
| 36 | 1 | 33 |
| 37 | 1 | 34 |
| 38 | 0 | 34 |
| 39 | 1 | 35 |
| 40 | 1 | 36 |
| 41 | 1 | 37 |
| 42 | 1 | 38 |
| 43 | 1 | 39 |
| 44 | 1 | 40 |
| 45 | 2 | 42 |
| 46 | 1 | 43 |
| 47 | 1 | 44 |
| 48 | 1 | 45 |
| 49 | 1 | 46 |
| 50 | 2 | 48 |
| 51 | 1 | 49 |
| 52 | 1 | 50 |
| 53 | 1 | 51 |
| 54 | 2 | 53 |
| 55 | 1 | 54 |
| 56 | 1 | 55 |
| 57 | 2 | 57 |
| 58 | 1 | 58 |
| 59 | 2 | 60 |
| 60 | 1 | 61 |
| 61 | 2 | 63 |
| 62 | 1 | 64 |
| 63 | 2 | 66 |
| 64 | 1 | 67 |
| 65 | 2 | 69 |
| 66 | 1 | 70 |
| 67 | 2 | 72 |
| 68 | 1 | 73 |
| 69 | 2 | 75 |
| 70 | 2 | 77 |
| 71 | 1 | 78 |
| 72 | 2 | 80 |
| 73 | 2 | 82 |
| 74 | 2 | 84 |
| 75 | 1 | 85 |
| 76 | 2 | 87 |
| 77 | 2 | 89 |
| 78 | 2 | 91 |
| 79 | 2 | 93 |
| 80 | 1 | 94 |
| 81 | 2 | 96 |
| 82 | 2 | 98 |
| 83 | 2 | 100 |
| 84 | 2 | 102 |
| 85 | 2 | 104 |
| 86 | 2 | 106 |
| 87 | 3 | 109 |
| 88 | 2 | 111 |
| 89 | 2 | 113 |
| 90 | 2 | 115 |
| 91 | 2 | 117 |
| 92 | 3 | 120 |
| 93 | 2 | 122 |
| 94 | 2 | 124 |
| 95 | 2 | 126 |
| 96 | 3 | 129 |
| 97 | 2 | 131 |
| 98 | 2 | 133 |
| 99 | 3 | 136 |
| 100 | 2 | 138 |
| 101 | 3 | 141 |
| 102 | 2 | 143 |
| 103 | 3 | 146 |
| 104 | 2 | 148 |
| 105 | 3 | 151 |
| 106 | 2 | 153 |
| 107 | 3 | 156 |
| 108 | 2 | 158 |
| 109 | 3 | 161 |
| 110 | 2 | 163 |
| 111 | 3 | 166 |
| 112 | 3 | 169 |
| 113 | 2 | 171 |
| 114 | 3 | 174 |
| 115 | 3 | 177 |
| 116 | 3 | 180 |
| 117 | 2 | 182 |
| 118 | 3 | 185 |
| 119 | 3 | 188 |
| 120 | 3 | 191 |
| 121 | 3 | 194 |
| 122 | 2 | 196 |
| 123 | 3 | 199 |
| 124 | 3 | 202 |

TABLE 1-continued

The TRUTH table of Pattern Generator

| S | D | V |
|---|---|---|
| 125 | 3 | 205 |
| 126 | 3 | 208 |
| 127 | 3 | 211 |
| 128 | 4 | 215 |
| 129 | 3 | 218 |
| 130 | 3 | 221 |
| 131 | 3 | 224 |
| 132 | 4 | 228 |
| 133 | 3 | 231 |
| 134 | 4 | 235 |
| 135 | 3 | 238 |
| 136 | 3 | 241 |
| 137 | 4 | 245 |
| 138 | 4 | 249 |
| 139 | 4 | 253 |
| 140 | 3 | 256 |
| 141 | 4 | 260 |
| 142 | 4 | 264 |
| 143 | 4 | 268 |
| 144 | 4 | 272 |
| 145 | 4 | 276 |
| 146 | 3 | 279 |
| 147 | 4 | 283 |
| 148 | 3 | 286 |
| 149 | 4 | 290 |
| 150 | 3 | 293 |
| 151 | 3 | 296 |
| 152 | 3 | 299 |
| 153 | 4 | 303 |
| 154 | 3 | 306 |
| 155 | 3 | 309 |
| 156 | 3 | 312 |
| 157 | 3 | 315 |
| 158 | 3 | 318 |
| 159 | 2 | 320 |
| 160 | 3 | 323 |
| 161 | 3 | 326 |
| 162 | 3 | 329 |
| 163 | 3 | 332 |
| 164 | 2 | 334 |
| 165 | 3 | 337 |
| 166 | 3 | 340 |
| 167 | 3 | 343 |
| 168 | 2 | 345 |
| 169 | 3 | 348 |
| 170 | 3 | 351 |
| 171 | 2 | 353 |
| 172 | 3 | 356 |
| 173 | 2 | 358 |
| 174 | 3 | 361 |
| 175 | 2 | 363 |
| 176 | 3 | 366 |
| 177 | 2 | 368 |
| 178 | 3 | 371 |
| 179 | 2 | 373 |
| 180 | 3 | 376 |
| 181 | 2 | 378 |
| 182 | 3 | 381 |
| 183 | 2 | 383 |
| 184 | 2 | 385 |
| 185 | 3 | 388 |
| 186 | 2 | 390 |
| 187 | 2 | 392 |
| 188 | 2 | 394 |
| 189 | 3 | 397 |
| 190 | 2 | 399 |
| 191 | 2 | 401 |
| 192 | 2 | 403 |
| 193 | 2 | 405 |
| 194 | 3 | 408 |
| 195 | 2 | 410 |
| 196 | 2 | 412 |
| 197 | 2 | 414 |
| 198 | 2 | 416 |
| 199 | 2 | 418 |
| 200 | 2 | 420 |
| 201 | 1 | 421 |
| 202 | 2 | 423 |
| 203 | 2 | 425 |
| 204 | 2 | 427 |
| 205 | 2 | 429 |
| 206 | 1 | 430 |
| 207 | 2 | 432 |
| 208 | 2 | 434 |
| 209 | 2 | 436 |
| 210 | 1 | 437 |
| 211 | 2 | 439 |
| 212 | 2 | 441 |
| 213 | 1 | 442 |
| 214 | 2 | 444 |
| 215 | 1 | 445 |
| 216 | 2 | 447 |
| 217 | 1 | 448 |
| 218 | 2 | 450 |
| 219 | 1 | 451 |
| 220 | 2 | 453 |
| 221 | 1 | 454 |
| 222 | 2 | 456 |
| 223 | 1 | 457 |
| 224 | 2 | 459 |
| 225 | 1 | 460 |
| 226 | 1 | 461 |
| 227 | 2 | 463 |
| 228 | 1 | 464 |
| 229 | 1 | 465 |
| 230 | 1 | 466 |
| 231 | 2 | 468 |
| 232 | 1 | 469 |
| 233 | 1 | 470 |
| 234 | 1 | 471 |
| 235 | 1 | 472 |
| 236 | 2 | 474 |
| 237 | 1 | 475 |
| 238 | 1 | 476 |
| 239 | 1 | 477 |
| 240 | 1 | 478 |
| 241 | 1 | 479 |
| 242 | 1 | 480 |
| 243 | 0 | 480 |
| 244 | 1 | 481 |
| 245 | 1 | 482 |
| 246 | 1 | 483 |
| 247 | 1 | 484 |
| 248 | 0 | 484 |
| 249 | 1 | 485 |
| 250 | 1 | 486 |
| 251 | 1 | 487 |
| 252 | 0 | 487 |
| 253 | 1 | 488 |
| 254 | 1 | 489 |
| 255 | 0 | 489 |
| 256 | 1 | 490 |
| 257 | 0 | 490 |
| 258 | 1 | 491 |
| 259 | 0 | 491 |
| 260 | 1 | 492 |
| 261 | 0 | 492 |
| 262 | 1 | 493 |
| 263 | 0 | 493 |
| 264 | 1 | 494 |
| 265 | 0 | 494 |
| 266 | 1 | 495 |
| 267 | 0 | 495 |
| 268 | 0 | 495 |
| 269 | 1 | 496 |
| 270 | 0 | 496 |
| 271 | 0 | 496 |
| 272 | 0 | 496 |
| 273 | 1 | 497 |
| 274 | 0 | 497 |

TABLE 1-continued

The TRUTH table of Pattern Generator

| S | D | V |
|---|---|---|
| 275 | 0 | 497 |
| 276 | 0 | 497 |
| 277 | 0 | 497 |
| 278 | 1 | 498 |
| 279 | 0 | 498 |
| 280 | 0 | 498 |
| 281 | 0 | 498 |
| 282 | 0 | 498 |
| 283 | 0 | 498 |
| 284 | 0 | 498 |
| 285 | −1 | 497 |
| 286 | 0 | 497 |
| 287 | 0 | 497 |
| 288 | 0 | 497 |
| 289 | 0 | 497 |
| 290 | −1 | 496 |
| 291 | 0 | 496 |
| 292 | 0 | 496 |
| 293 | 0 | 496 |
| 294 | −1 | 495 |
| 295 | 0 | 495 |
| 296 | 0 | 495 |
| 297 | −1 | 494 |
| 298 | 0 | 494 |
| 299 | −1 | 493 |
| 300 | 0 | 493 |
| 301 | −1 | 492 |
| 302 | 0 | 492 |
| 303 | −1 | 491 |
| 304 | 0 | 491 |
| 305 | −1 | 490 |
| 306 | 0 | 490 |
| 307 | −1 | 489 |
| 308 | 0 | 489 |
| 309 | −1 | 488 |
| 310 | −1 | 487 |
| 311 | 0 | 487 |
| 312 | −1 | 486 |
| 313 | −1 | 485 |
| 314 | −1 | 484 |
| 315 | 0 | 484 |
| 316 | −1 | 483 |
| 317 | −1 | 482 |
| 318 | −1 | 481 |
| 319 | −1 | 480 |
| 320 | 0 | 480 |
| 321 | −1 | 479 |
| 322 | −1 | 478 |
| 323 | −1 | 477 |
| 324 | −1 | 476 |
| 325 | −1 | 475 |
| 326 | −1 | 474 |
| 327 | −2 | 472 |
| 328 | −1 | 471 |
| 329 | −1 | 470 |
| 330 | −1 | 469 |
| 331 | −1 | 468 |
| 332 | −2 | 466 |
| 333 | −1 | 465 |
| 334 | −1 | 464 |
| 335 | −1 | 463 |
| 336 | −2 | 461 |
| 337 | −1 | 460 |
| 338 | −1 | 459 |
| 339 | −2 | 457 |
| 340 | −1 | 456 |
| 341 | −2 | 454 |
| 342 | −1 | 453 |
| 343 | −2 | 451 |
| 344 | −1 | 450 |
| 345 | −2 | 448 |
| 346 | −1 | 447 |
| 347 | −2 | 445 |
| 348 | −1 | 444 |
| 349 | −2 | 442 |
| 350 | −1 | 441 |
| 351 | −2 | 439 |
| 352 | −2 | 437 |
| 353 | −1 | 436 |
| 354 | −2 | 434 |
| 355 | −2 | 432 |
| 356 | −2 | 430 |
| 357 | −1 | 429 |
| 358 | −2 | 427 |
| 359 | −2 | 425 |
| 360 | −2 | 423 |
| 361 | −2 | 421 |
| 362 | −1 | 420 |
| 363 | −2 | 418 |
| 364 | −2 | 416 |
| 365 | −2 | 414 |
| 366 | −2 | 412 |
| 367 | −2 | 410 |
| 368 | −2 | 408 |
| 369 | −3 | 405 |
| 370 | −2 | 403 |
| 371 | −2 | 401 |
| 372 | −2 | 399 |
| 373 | −2 | 397 |
| 374 | −3 | 394 |
| 375 | −2 | 392 |
| 376 | −2 | 390 |
| 377 | −2 | 388 |
| 378 | −3 | 385 |
| 379 | −2 | 383 |
| 380 | −2 | 381 |
| 381 | −3 | 378 |
| 382 | −2 | 376 |
| 383 | −3 | 373 |
| 384 | −2 | 371 |
| 385 | −3 | 368 |
| 386 | −2 | 366 |
| 387 | −3 | 363 |
| 388 | −2 | 361 |
| 389 | −3 | 358 |
| 390 | −2 | 356 |
| 391 | −3 | 353 |
| 392 | −2 | 351 |
| 393 | −3 | 348 |
| 394 | −3 | 345 |
| 395 | −2 | 343 |
| 396 | −3 | 340 |
| 397 | −3 | 337 |
| 398 | −3 | 334 |
| 399 | −2 | 332 |
| 400 | −3 | 329 |
| 401 | −3 | 326 |
| 402 | −3 | 323 |
| 403 | −3 | 320 |
| 404 | −2 | 318 |
| 405 | −3 | 315 |
| 406 | −3 | 312 |
| 407 | −3 | 309 |
| 408 | −3 | 306 |
| 409 | −3 | 303 |
| 410 | −4 | 299 |
| 411 | −3 | 296 |
| 412 | −3 | 293 |
| 413 | −3 | 290 |
| 414 | −4 | 286 |
| 415 | −3 | 283 |
| 416 | −4 | 279 |
| 417 | −3 | 276 |
| 418 | −3 | 273 |
| 419 | −4 | 269 |
| 420 | −4 | 265 |
| 421 | −4 | 261 |
| 422 | −3 | 258 |
| 423 | −4 | 254 |
| 424 | −4 | 250 |

TABLE 1-continued

The TRUTH table of Pattern Generator

| S | D | V |
|---|---|---|
| 425 | −4 | 246 |
| 426 | −4 | 242 |
| 427 | −4 | 238 |
| 428 | −3 | 235 |
| 429 | −4 | 231 |
| 430 | −3 | 228 |
| 431 | −4 | 224 |
| 432 | −3 | 221 |
| 433 | −3 | 218 |
| 434 | −3 | 215 |
| 435 | −4 | 211 |
| 436 | −3 | 208 |
| 437 | −3 | 205 |
| 438 | −3 | 202 |
| 439 | −3 | 199 |
| 440 | −3 | 196 |
| 441 | −2 | 194 |
| 442 | −3 | 191 |
| 443 | −3 | 188 |
| 444 | −3 | 185 |
| 445 | −3 | 182 |
| 446 | −2 | 180 |
| 447 | −3 | 177 |
| 448 | −3 | 174 |
| 449 | −3 | 171 |
| 450 | −2 | 169 |
| 451 | −3 | 166 |
| 452 | −3 | 163 |
| 453 | −2 | 161 |
| 454 | −3 | 158 |
| 455 | −2 | 156 |
| 456 | −3 | 153 |
| 457 | −2 | 151 |
| 458 | −3 | 148 |
| 459 | −2 | 146 |
| 460 | −3 | 143 |
| 461 | −2 | 141 |
| 462 | −3 | 138 |
| 463 | −2 | 136 |
| 464 | −3 | 133 |
| 465 | −2 | 131 |
| 466 | −2 | 129 |
| 467 | −3 | 126 |
| 468 | −2 | 124 |
| 469 | −2 | 122 |
| 470 | −2 | 120 |
| 471 | −3 | 117 |
| 472 | −2 | 115 |
| 473 | −2 | 113 |
| 474 | −2 | 111 |
| 475 | −2 | 109 |
| 476 | −3 | 106 |
| 477 | −2 | 104 |
| 478 | −2 | 102 |
| 479 | −2 | 100 |
| 480 | −2 | 98 |
| 481 | −2 | 96 |
| 482 | −2 | 94 |
| 483 | −1 | 93 |
| 484 | −2 | 91 |
| 485 | −2 | 89 |
| 486 | −2 | 87 |
| 487 | −2 | 85 |
| 488 | −1 | 84 |
| 489 | −2 | 82 |
| 490 | −2 | 80 |
| 491 | −2 | 78 |
| 492 | −1 | 77 |
| 493 | −2 | 75 |
| 494 | −2 | 73 |
| 495 | −1 | 72 |
| 496 | −2 | 70 |
| 497 | −1 | 69 |
| 498 | −2 | 67 |
| 499 | −1 | 66 |
| 500 | −2 | 64 |
| 501 | −1 | 63 |
| 502 | −2 | 61 |
| 503 | −1 | 60 |
| 504 | −2 | 58 |
| 505 | −1 | 57 |
| 506 | −2 | 55 |
| 507 | −1 | 54 |
| 508 | −1 | 53 |
| 509 | −2 | 51 |
| 510 | −1 | 50 |
| 511 | −1 | 49 |
| 512 | −1 | 48 |
| 513 | −2 | 46 |
| 514 | −1 | 45 |
| 515 | −1 | 44 |
| 516 | −1 | 43 |
| 517 | −1 | 42 |
| 518 | −2 | 40 |
| 519 | −1 | 39 |
| 520 | −1 | 38 |
| 521 | −1 | 37 |
| 522 | −1 | 36 |
| 523 | −1 | 35 |
| 524 | −1 | 34 |
| 525 | 0 | 34 |
| 526 | −1 | 33 |
| 527 | −1 | 32 |
| 528 | −1 | 31 |
| 529 | −1 | 30 |
| 530 | 0 | 30 |
| 531 | −1 | 29 |
| 532 | −1 | 28 |
| 533 | −1 | 27 |
| 534 | 0 | 27 |
| 535 | −1 | 26 |
| 536 | −1 | 25 |
| 537 | 0 | 25 |
| 538 | −1 | 24 |
| 539 | 0 | 24 |
| 540 | −1 | 23 |
| 541 | 0 | 23 |
| 542 | −1 | 22 |
| 543 | 0 | 22 |
| 544 | −1 | 21 |
| 545 | 0 | 21 |
| 546 | −1 | 20 |
| 547 | 0 | 20 |
| 548 | −1 | 19 |
| 549 | 0 | 19 |
| 550 | 0 | 19 |
| 551 | −1 | 18 |
| 552 | 0 | 18 |
| 553 | 0 | 18 |
| 554 | 0 | 18 |
| 555 | −1 | 17 |
| 556 | 0 | 17 |
| 557 | 0 | 17 |
| 558 | 0 | 17 |
| 559 | 0 | 17 |
| 560 | −1 | 16 |
| 561 | 0 | 16 |
| 562 | 0 | 16 |
| 563 | 0 | 16 |

As will be appreciated by one of ordinary skill in the art, a feed digital delay line 34 functions to provide a selected delay to an input signal, the duration of which delay is dictated by an input thereto such is provided by the output of pattern generator 50. Thus, a clock signal 30 will be provided with a selected delay, as dictated by the output of the pattern generator 40, and this delay will be provided on output 52. It will be appreciated, therefore, that interaction between the counter 38, pattern generator 40 and digital delay line 34 will serve to provide a selected delay sequence to respective pulses of the clock signal at input 30, as it is output to output 52. In this fashion, the entire sequence of delay is suitably fabricated from digital elements and avoids implementation of the VCO/PLL circuitry as provided in connection with FIG. 1A, above.

Figure 3:
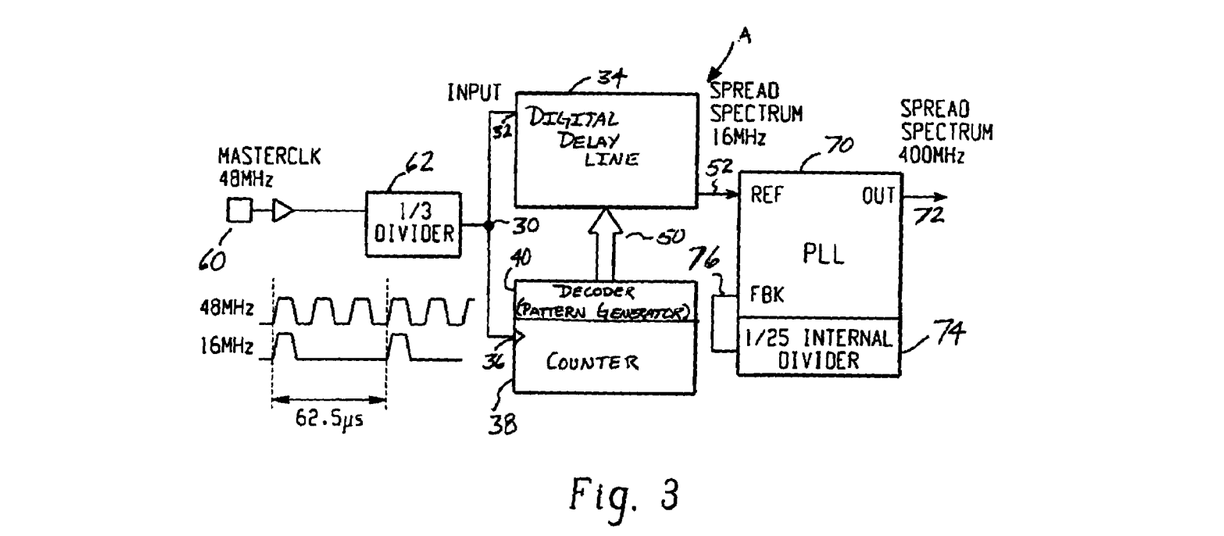
FIG. 3 is a block diagram of the spread spectrum clock generator of the subject invention inclusive of a master clock, the frequency of which is lowered prior to alteration of a frequency and raised after completion thereof.

Turning now to FIG. 3, the SSCG A of FIG. 1A is shown in connection with additional support circuitry. Conventional switching circuitry currently operates in the multi-gigahertz range. It will be appreciated that implementation of the counter, pattern generator and digital delay line, such as described herein, is more readily adapted to perform at lower frequencies than this. The additional structure of FIG. 3 accomplishes the beneficial advantages of the subject invention while facilitating use in connection with substantially higher clock frequencies. An input from a master clock 60 has communicated to a divider 62 to divide the frequency thereof. In the preferred embodiments, divider 62 is a ⅓ divider. By way of example, an input master clock frequency of 48 MHz provided at input 60 would result in a 16 MHz signal being provided at the output of divider 62, which forms the clock input 30. Thus, a period of 20.83 microseconds can be extended to a period of 62.5 microseconds. The function of the SSCG A is as described in connection with FIG. 2, above.

Turning now to the output 52 of digital delay line 34 in FIG. 3, in this embodiment the output forms an input to a phaselock loop 70. As will be appreciated by one of ordinary skill in the art, the PLL 70 suitably serves as a signal conditioner to clean an output pulse, as well as a system for stepping up an input frequency. The PLL 70 suitably takes an input of 16 MHz, as provided from the output 52 of the digital delay line 34, and outputs a substantially higher frequency, 400 MHz in the preferred embodiment and which output is provided at 72. Also, an internal divider 74 suitably provides feedback at terminal 76 to allow for the enhanced output at 72.

Figure 4:
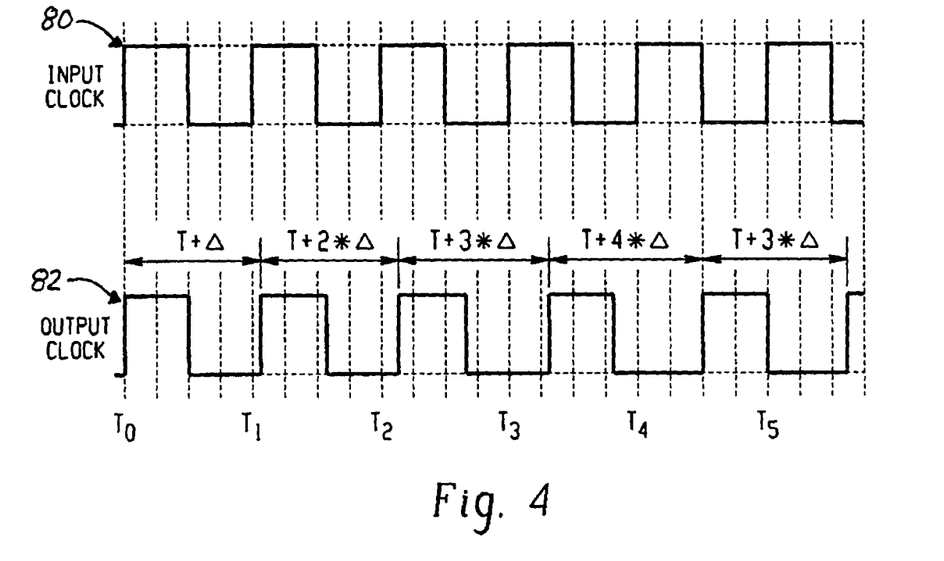
FIG. 4 is a diagram of the input clock wave form as compared to the output clock which has been processed for spread spectrum frequency modulation.

Turning now to FIG. 4, a comparison of an input clock and an output clock 82 is described as a function of time. The input clock shows a suitable system clock input, such as may be provided at digital delay line input 30 (FIG. 1A) or master clock input 60 (FIG. 2). An output waveform 82 evidences a skew in frequency as provided by the SSCG circuitry described above.

Turning now to Table 1, disclosed is a suitable true table of the content of a pattern generator such as described herein. In the preferred embodiment, the decoder content of the subject invention will be applied with every 564 clock cycles. In this fashion, a modulation frequency of around 28 KHz is provided. As used in Table 1, S refers to "step", D "delay value", and V refers to "decoder value". The step value S is incremented with every input clock pulse, such as that provided at input 30 (FIG. 1A or FIG. 2). A specified delay value and decoder value follows every increment of the counter 38. While the values of FIG. 1A are provided in the preferred embodiment, it will be appreciated that other suitable values may be implemented to accomplish the delays of the subject invention.

Turning now to Table 2, an exemplary output of the pattern generator 40 is detailed. As evidenced in Table 2, the counter will increment at every input clock. At such point as a counter shows a value of 16, the next value will be reset to a 0. Thus, the pattern generator will decode a counter value to appear in the column "Pattern" and feed it to the delay line (50) (FIGS. 2 and 3). As noted above, the delay line 34 will delay an input clock by the value given from its input 50. By way of example, when a counter value is set at 0, delay value is 0. When a counter achieves 1, the delay is 1. Next, the delay value will skip 1 and the result will be 3. As evidenced in FIG. 2, the values of column DELTA P show the difference between each adjacent account. This sequence of delta values, up and down in the preferred embodiment, is evidenced therein.

TABLE 2

Example of pattern generator table

| Count | Pattern | DELTA T | Delta T |
|---|---|---|---|
| 0 | 0 | 0 | 0.00% |
| 1 | 1 | 1 | 0.05% |
| 2 | 3 | 2 | 0.10% |
| 3 | 6 | 3 | 0.15% |
| 4 | 10 | 4 | 0.20% |
| 5 | 13 | 3 | 0.15% |
| 6 | 15 | 2 | 0.10% |
| 7 | 16 | 1 | 0.05% |
| 8 | 16 | 0 | 0.00% |
| 9 | 15 | −1 | −0.05% |
| 10 | 13 | −2 | −0.10% |
| 11 | 10 | −3 | −0.15% |
| 12 | 6 | −4 | −0.20% |
| 13 | 3 | −3 | −0.15% |
| 14 | 1 | −2 | −0.10% |
| 15 | 0 | −1 | −0.05% |

Referring back to FIG. 3, when an input to the SSCG A is at a value T, a first period and its corresponding output is T1−T0, which is T+Δ. As used herein, Δ is a unidelay of the delay line. As used herein:

T1−T0=T+Δ

T2−T1=T+2*Δ

T3−T2=T+3*Δ

T4−T3=T+4*Δ

T5−T4=T+3*Δ

Figure 5:
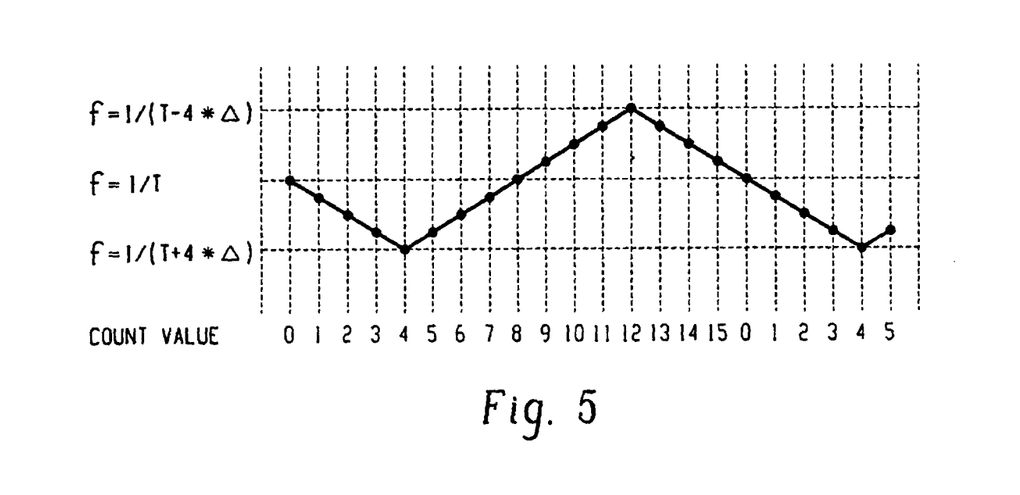
FIG. 5 is a graph of clock period versus frequency delta associated with the spread spectrum clock generation of the subject invention.

Turning now to FIG. 5, discloses a graph evidencing the frequency modulation scheme of the preferred embodiment. With the implementation described in the preferred embodiment, detailed above, it will be appreciated that the frequency modulation scheme employed by the circuitry of the subject invention provides for modulation analogous to that provided in conventional circuitry, as evidenced by FIG. 1B. Thus, the subject system provides for spread spectrum clock generation so as to provide all the advantages of the earlier system, but in a substantially improved, digital structure that is readily adaptable to integration and low cost and effective applications.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

Having thus described the invention, it is now claimed:

1. A spread spectrum clock generator comprising:
   means adapted for receiving a periodic clock signal having a generally constant frequency;
   a frequency divider for generating a lower frequency clock signal from a received periodic clock signal;
   a programmable digital delay line adapted to receive the lower frequency clock signal, and including means provide a selected delay to the lower frequency clock signal in accordance with a received digital delay value so as to form a varying frequency clock signal;
   a counter for generating a preselected digital sequence;
   a pattern generator adapted for generating the digital delay value in accordance with the preselected digital sequence;
   a frequency multiplier for increasing a frequency of the varying frequency clock signal so as to generate a spread spectrum clock signal; and
   means adapted for communicating the spread spectrum clock signal to an associated digital device.

2. The spread spectrum clock generator of claim 1 wherein the spread spectrum clock signal has a frequency range between $1/(T-4\Delta)$ and $1/(T+4\Delta)$, wherein T is defined as a period of the clock input signal and $\Delta$ is defined as the selected delay.

3. The spread spectrum clock generator of claim 2 wherein the frequency range of the spread spectrum clock signal linearly alternates between $1/(T-4\Delta)$ and $1/(T+4\Delta)$.

4. The spread spectrum clock generator of claim 3 wherein the frequency range of the spread spectrum clock signal varies from −0.2% to +0.2% of the periodic clock signal.

5. The spread spectrum clock generator of claim 4 wherein the pattern generator includes a digital delay value generator to output the digital delay value in accordance with values disposed in a preselected truth table.

6. The spread spectrum clock generator of claim 3 wherein the counter operates in response to the periodic clock signal.

7. A spread spectrum clock generator comprising:
   a clock input adapted for receiving a clock signal having a generally constant frequency;
   a digital delay having,
      delay input adapted for receiving the clock signal from the clock input and a clock output,
      data input adapted for receiving delay data representative of a selected delay, and
      a clock output, the clock output adapted to communicate a modified clock signal, the frequency of the modified clock signal is adjusted in accordance with the delay data;
   a numeric sequencer adapted for generating a selected numeric output data representative of a selected numeric sequence; and
   means for communicating the numeric output data to the data input as the delay data;
   wherein the numeric sequencer includes a binary counter for generating a binary output sequence;
   wherein the numeric sequencer further includes a pattern generator, which pattern generator receives the binary output sequence from the binary counter, and generates the delay data as a function of the binary output sequence;
   wherein the modified clock signal has a frequency range between $1/(T-4\Delta)$ and $1/(T+4\Delta)$, wherein T is defined as a period of the clock input signal and $\Delta$ is defined as the selected delay.

8. The spread spectrum clock generator of claim 7 wherein the frequency range of the modified clock signal linearly alternates between $1/(T-4\Delta)$ and $1/(T+4\Delta)$.

9. The spread spectrum clock generator of claim 8 further comprising a signal conditioner adapted for receiving the modified clock signal and generating a conditioned clock signal therefrom.

10. The spread spectrum clock generator of claim 9 wherein the signal conditioner further comprises a frequency multiplier.

11. The spread spectrum clock generator of claim 10 wherein the signal conditioner includes a phase lock loop.

12. A method of generating a spread spectrum clock signal comprising the steps of:
   receiving a clock signal having a generally constant frequency;
   generating a low frequency clock signal corresponding to the received clock signal;
   generating selected numeric output data representative of a selected numeric sequence, which numeric output data is generated synchronously with the received clock signal;
   generating a varying frequency clock signal from the low frequency clock signal, the delayed clock signal having a delay set in accordance with the selected numeric output sequence;
   increasing the overall frequency of the varying frequency clock signal;
   wherein the step of generating selected numeric output data includes the steps of:
      incrementing a counter in accordance with the received clock signal;
      generating counter data representative of a state of the counter;
      generating pattern data that corresponds to the counter data; and
      generating the selected numeric sequence from the pattern data;
   wherein the step of generating pattern data includes the step of generating the spread spectrum clock signal in accordance with values associated with a preselected truth table.

13. The method of generating a spread spectrum clock signal of claim 12 wherein the spread spectrum clock signal has a frequency range between $1/(T-4\Delta)$ and $1/(T+4\Delta)$, wherein T is defined as a period of the clock input signal and $\Delta$ is defined as the selected delay.

14. The method of generating a spread spectrum clock signal of claim 13 wherein the frequency range of the spread spectrum clock signal linearly alternates between $1/(T-4\Delta)$ and $1/(T+4\Delta)$.

15. The method of generating a spread spectrum clock signal of claim 14 wherein the frequency range of the spread spectrum clock signal varies from −0.2% to +0.2% of the periodic clock signal.

* * * * *

UNITED STATES PATENT AND TRADEMARK OFFICE
CERTIFICATE OF CORRECTION

PATENT NO. : 7,236,057 B2
APPLICATION NO. : 10/647929
DATED : June 26, 2007
INVENTOR(S) : Masao Kaizuka It is certified that error appears in the above-identified patent and that said Letters Patent is hereby corrected as shown below:

Delete the title page and substitute therefore the attached title page.

Delete Drawing Sheets 1 of 3 and 2 of 3 and substitute therefore the attached Drawing Sheets 1 of 3 and 2 of 3.

Column 13, line 24, replace "signal and A is" with --signal and $\Delta$ is--.

Signed and Sealed this

Thirteenth Day of November, 2007

JON W. DUDAS
*Director of the United States Patent and Trademark Office*

(12) United States Patent
Kaizuka (10) Patent No.: US 7,236,057 B2
(45) Date of Patent: *Jun. 26, 2007

(54) SPREAD SPECTRUM CLOCK GENERATOR (75) Inventor: Masao Kaizuka, San Jose, CA (US)

(73) Assignee: Toshiba America Electronic Components, Inc., Irvine, CA (US)

(*) Notice: Subject to any disclaimer, the term of this patent is extended or adjusted under 35 U.S.C. 154(b) by 630 days.

This patent is subject to a terminal disclaimer.

(21) Appl. No.: 10/647,929

(22) Filed: Aug. 26, 2003

(65) Prior Publication Data
US 2005/0069019 A1 Mar. 31, 2005

(51) Int. Cl.
H03L 7/00 (2006.01)

(52) U.S. Cl. .............. 331/1 A; 331/78; 332/123; 375/130; 375/376; 713/500

(58) Field of Classification Search .......... 375/376, 375/130; 327/156; 332/123; 713/500; 331/1 A, 331/78
See application file for complete search history.

(56) References Cited

U.S. PATENT DOCUMENTS

| | | | |
|---|---|---|---|
| 3,833,854 A | 9/1974 | Schonover | |
| 5,118,975 A | 6/1992 | Hillis et al. | |
| 5,488,627 A | 1/1996 | Harden et al. | |
| 5,631,920 A | 5/1997 | Hardin | |
| 5,675,832 A | 10/1997 | Ikuni et al. | |
| 5,867,524 A | 2/1999 | Booth et al. | |
| 5,872,807 A | 2/1999 | Booth et al. | |
| 6,144,242 A | 11/2000 | Jeong et al. | |
| 6,404,834 B1 | 6/2002 | Hardin et al. | |
| 6,501,307 B1 | 12/2002 | Yen | |
| 6,553,057 B1 | 4/2003 | Sha et al. | |
| 6,993,109 B2 * | 1/2006 | Leo et al. | 375/376 |

* cited by examiner

*Primary Examiner*—Arnold Kinkead
(74) *Attorney, Agent, or Firm*—Tucker Ellis & West LLP (57) ABSTRACT

A clock signal generator varies a frequency of a digital clock over a selected range of frequencies. The generator employs a divider for lowering a frequency of a clock signal. A counter increments synchronously with the signal, and causes a selected sequence of outputs to be generated by a pattern generator. The pattern generator output forms an input to a digitally controllable delay line which receives the lower frequency clock signal. The pattern generator causes the digital delay line to vary a frequency of the lowered frequency clock signal between selected boundaries. The varying frequency clock signal is then raised up again such that a final clock has a varying frequency, and will exhibit less EMI spiking during switching of an associated, synchronous digital data device. The solid state nature of the generator allows for simple fabrication, inexpensive manufacture and ready integration into digital circuitry, such as multifunction integrated circuits.

15 Claims, 3 Drawing Sheets